Figure 5:
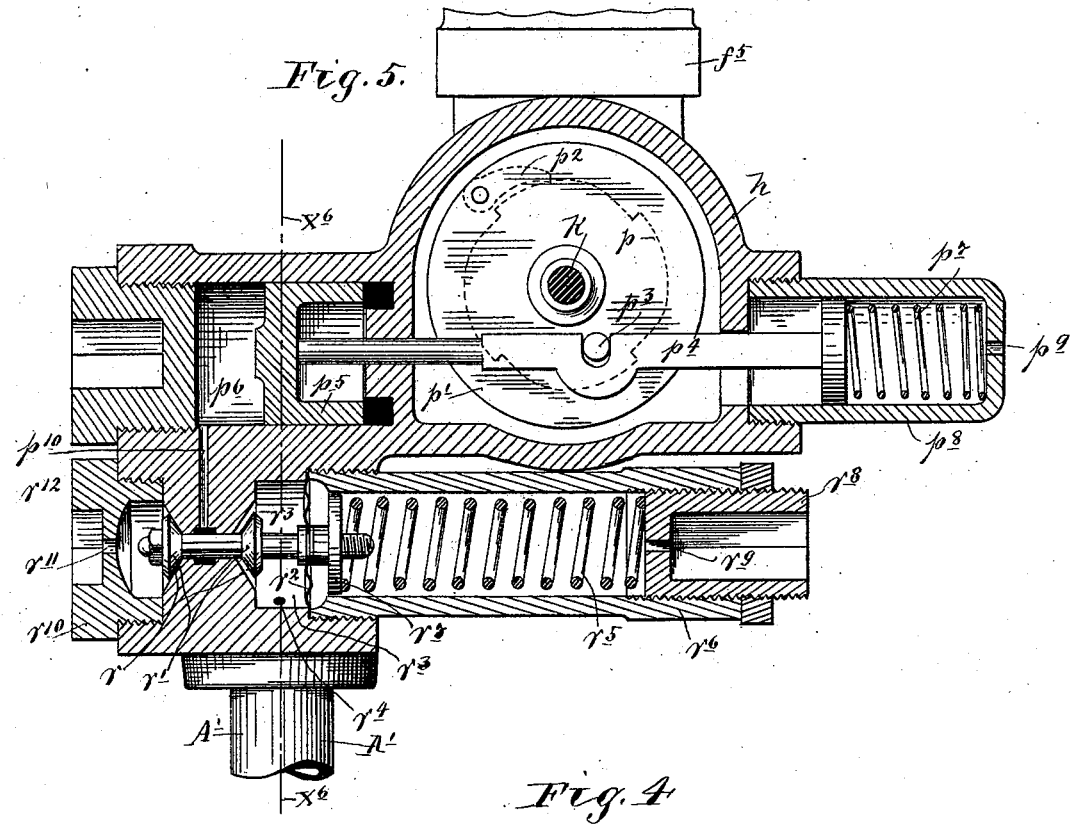

(No Model.)
J. K. LENCKE.
CONTROLLER AND ARIGHTER FOR AIR BRAKE RETAINERS.
No. 517,955. Patented Apr. 10, 1894.
5 Sheets—Sheet 1.
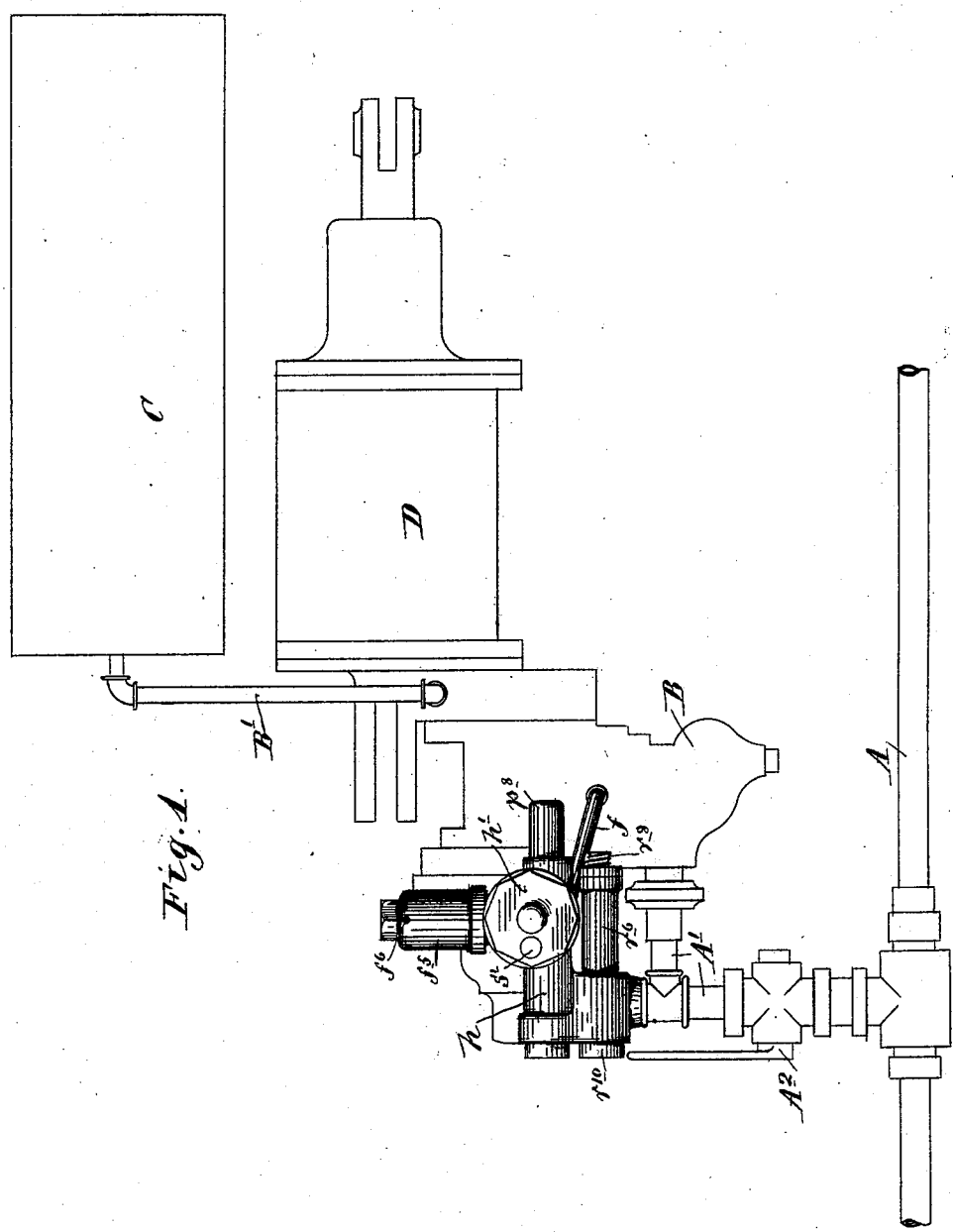
Witnesses.
A. H. Opsahl.
Frank D. Merchant.
Inventor.
John K. Lencke
By his Attorney.
Jas. F. Williamson (No Model.) J. K. LENCKE. 5 Sheets—Sheet 2.
CONTROLLER AND ARIGHTER FOR AIR BRAKE RETAINERS.
No. 517,955. Patented Apr. 10, 1894.
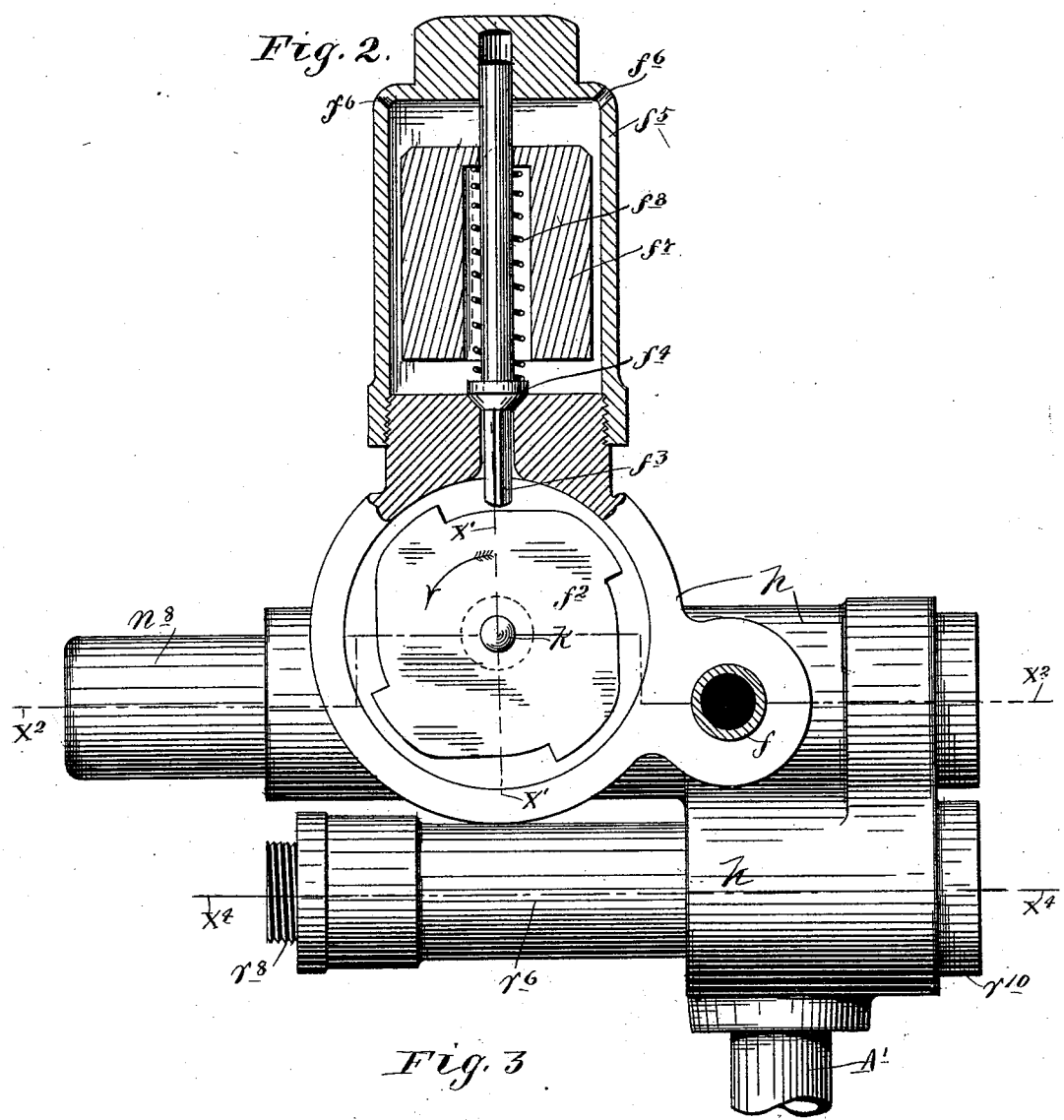
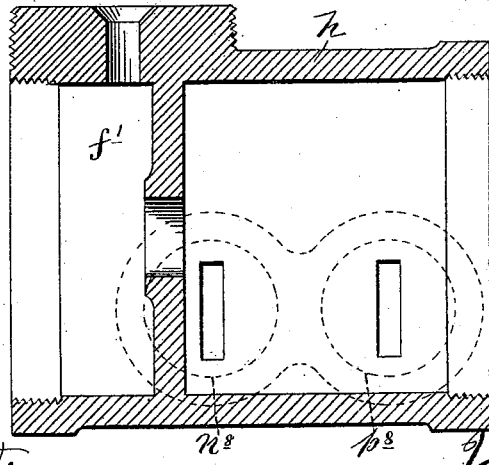
Witnesses.
A. H. Opsahl
Frank D. Merchant
Inventor.
John K. Lencke
By his Attorney
Jas. F. Williamson (No Model.) 5 Sheets—Sheet 3.

J. K. LENCKE.
CONTROLLER AND ARIGHTER FOR AIR BRAKE RETAINERS.

No. 517,955. Patented Apr. 10, 1894.

Witnesses.
A. H. Opsahl.
Frank D. Merchant.

Inventor.
John K. Lencke
By his Attorney
Jas. F. Williamson (No Model.)   J. K. LENCKE.   5 Sheets—Sheet 4.
CONTROLLER AND ARIGHTER FOR AIR BRAKE RETAINERS.
No. 517,955.   Patented Apr. 10, 1894.

Witnesses.
A. H. Opsahl.
Frank D. Merchant.

Inventor.
John K. Lencke
By his Attorney.
Jas. F. Williamson (No Model.) 5 Sheets—Sheet 5.
J. K. LENCKE.
CONTROLLER AND ARIGHTER FOR AIR BRAKE RETAINERS.
No. 517,955. Patented Apr. 10, 1894.

Witnesses
A. H. Opsahl.
Frank D. Merchant.

Inventor.
John K. Lencke
By his Attorney.
Jas. F. Williamson

UNITED STATES PATENT OFFICE.

JOHN K. LENCKE, OF MINNEAPOLIS, MINNESOTA.

CONTROLLER AND ARIGHTER FOR AIR-BRAKE RETAINERS.

SPECIFICATION forming part of Letters Patent No. 517,955, dated April 10, 1894.

Application filed August 15, 1893. Serial No. 483,172. (No model.)

*To all whom it may concern:*

Be it known that I, JOHN K. LENCKE, a citizen of the United States, residing at Minneapolis, in the county of Hennepin and State of Minnesota, have invented certain new and useful Improvements in Controllers and Arighters for Air-Brake Retainers; and I do hereby declare the following to be a full, clear, and exact description of the invention, such as will enable others skilled in the art to which it appertains to make and use the same.

My invention relates to fluid pressure brake apparatus; and has for its object to effect an improvement in the pressure retaining valve mechanism, and in the controlling and arighting devices for the same.

My present invention, is in the same line as the inventions described in the sole application of John K. Lencke, filed October 2, 1891, under Serial No. 407,587, and the joint application of John K. Lencke and Frank D. Merchant, filed July 10, 1893, under Serial No. 480,027.

One feature of the invention is directed to an improvement in the pressure retaining valve mechanism itself, whereby a single (reduction) valve may be made, both to afford a free exhaust from the brake-motor and to retain a limited pressure thereon, whenever so desired.

The principal feature of the invention, however, is directed to the controlling and arighting devices, and is in the nature of an addition to and modification of the construction shown in the above identified joint application of Lencke and Merchant, with a view of rendering the same quicker in action and more reliable in service.

The controlling and arighting devices described in the above identified joint application, were found in practice to perform the work, for which they were designed; but a difficulty was encountered, on account of the equalizing action on the controller and arighter pistons between the train-pipe pressures and the resistance springs. In order to properly seat the pistons of the controllers and arighters, the train-pipe pressure had to be raised several pounds above the resistances afforded by the springs. At or near the point of equalization, the pistons would vibrate and permit more or less leakage.

My present invention entirely overcomes the above defect or limitation; and I accomplish the same by interposing a device in the form of a two-way trip-valve, between the train-pipe and the cylinders of the controller and arighter motors, which is normally open, to admit train-pipe pressure behind the controller and arighter pistons, for holding the same seated against their resistance springs; but which, when the train-pipe pressure has been reduced to the pre-determined point, will shift its position, cutting off the supply from the train-pipe and opening the controller and arighter cylinders to exhaust. The trip-valve is attached to a movable body, such as a diaphragm or piston, subject to train-pipe pressure on one side, and to a pre-determined yielding resistance, such as a graduated spring, on the other. Hence, variation of train-pipe pressure, in co-operation with the said graduated spring, will operate the said trip-valve, to open the controller and arighter motors to supply and exhaust. There may, therefore, be a wide margin between the tension of the resistance springs and the fluid pressures, applied to the controller and arighter pistons, and yet the said springs be left of sufficient power, to readily move the said pistons and their connecting parts. There is thus afforded a comparatively large excess of power, for moving the said pistons in each direction, at the times when said movements are required; which fact renders the said parts very quick in their action.

My invention, in its several features, will be hereinafter fully described and be defined in the claims.

The accompanying drawings illustrate my preferred construction, wherein like letters refer to like parts throughout the several views.

Figure 4:
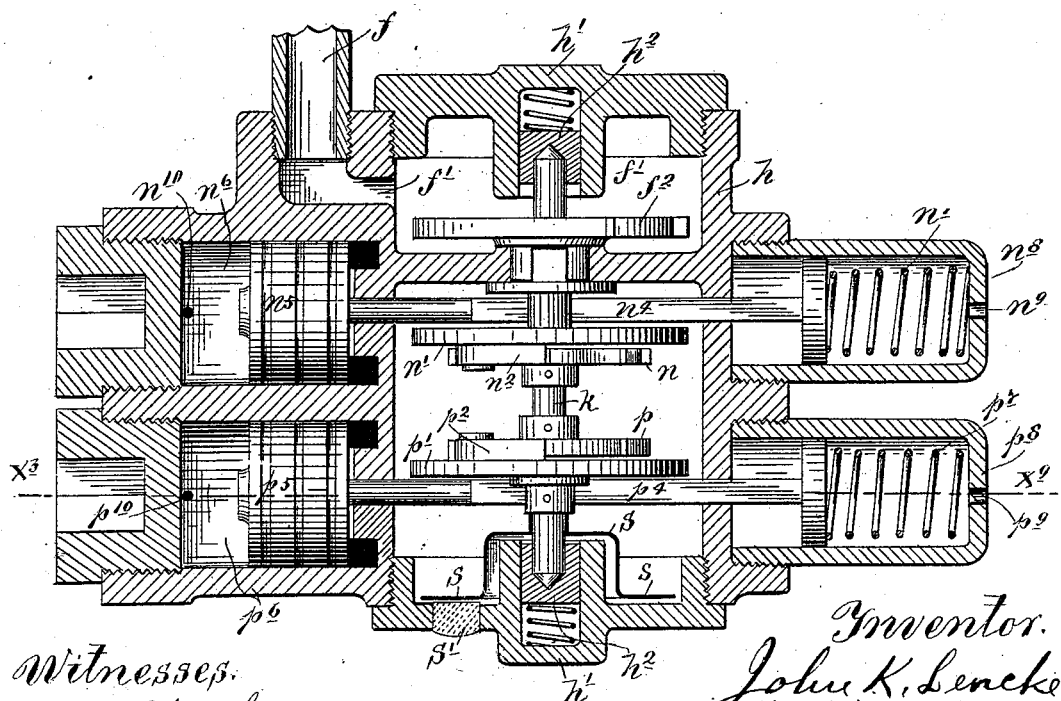
Figure 6:
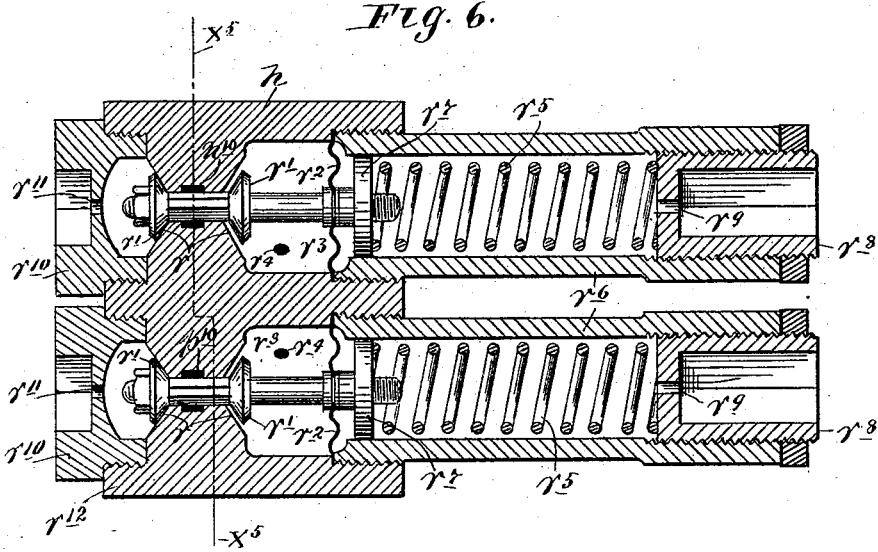
Figure 7:
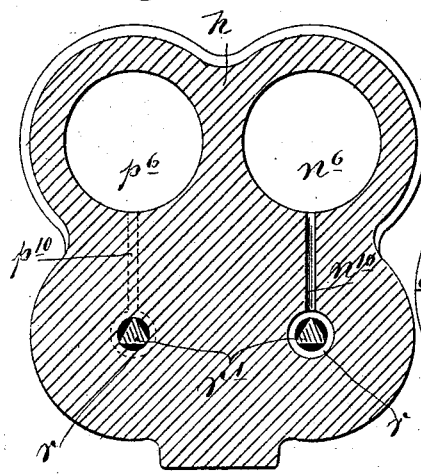
Figure 11:
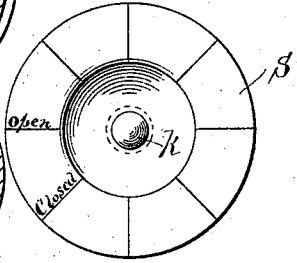
Figure 8:
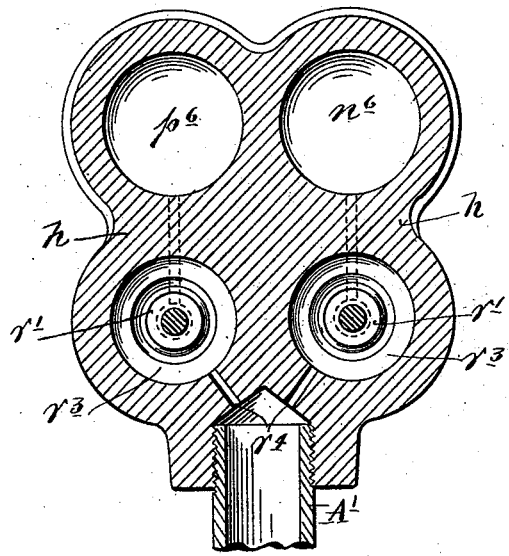
Figure 9:
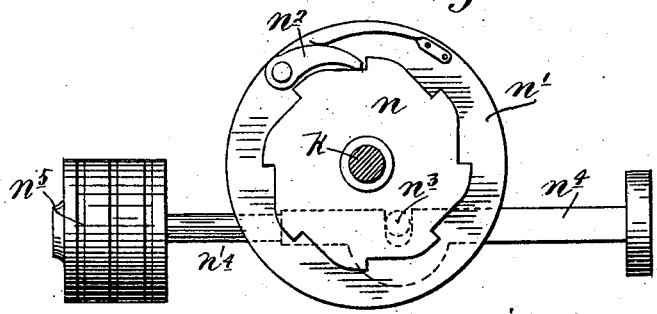
Figure 10:
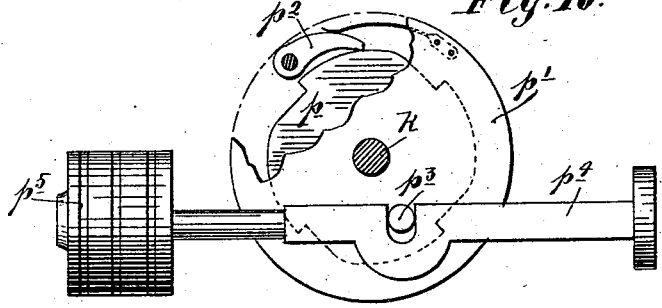

Figure 1 is a diagram view of a brake apparatus, with the pressure retaining valve mechanism, shown in side elevation, in fully worked up lines. Fig. 2 is a view chiefly in rear elevation of the retaining valve mechanism detached, the valve being shown in vertical section, and some parts being removed. Fig. 3 is a vertical cross section, on the line X' X' of Fig. 2, showing simply the casing-casting, all other parts being removed. Fig. 4 is a horizontal section, on the irregular line $X^2 X^2$, of Fig. 2. Fig. 5 is a vertical section, through the entire device, on the line $X^3 X^3$ of Fig. 4, some parts being broken away. Fig. 6 is a horizontal section, on the line $X^4 X^4$ of Fig. 2. Fig. 7 is a section, on the line $X^5 X^5$ of Fig. 6, looking from the right. Fig. 8 is a section, on the line $X^6 X^6$ of Fig. 5, looking from the right. Figs. 9 and 10 are views in front elevation, showing, respectively, the controller piston and the pawl and ratchet device operated thereby, and the arighter piston, and the pawl and ratchet device operated thereby; and Fig. 11 is a front elevation of the indicator dial detached.

Referring especially to Fig. 1, A represents the train-pipe, B the triple-valve, C the auxiliary reservoir and D the brake-motor, of one of the standard (Westinghouse) air-brake apparatus. A' represents the train-pipe connection to the triple valve, provided with the ordinary stop-cock $A^2$; and B' represents the connection, from the auxiliary reservoir C to the triple-valve B. The relation and operation of these parts is well-known, and need not be repeated here. It may, with advantage, however, be recalled to mind, that the train-pipe and auxiliary reservoirs are charged to equal pressures from the main reservoir through the triple-valve, which, in ordinary practice, is seventy pounds; that the brakes are set by a reduction of train-pipe pressure, the brake-motor being thrown into communication with the auxiliary reservoir, through the triple-valve, by the action, on said valve of the excessive pressure in the auxiliary reservoir over that in the train-pipe; that the proportions between the auxiliary reservoir and the brake motor cylinder, are, ordinarily, such, that, when the train-pipe pressure has been reduced sufficiently for maximum brake setting power, in service applications, the pressures in the auxiliary reservoir and brake-motor cylinder will equalize at fifty pounds. Hence, disregarding emergency applications, any further reduction of train-pipe pressure, below fifty pounds, will have no additional effect on the brake motor; but will simply bleed the train-pipe. Between seventy and fifty pounds, the force with which the brakes will be set is dependent, in service applications on the amount of the reduction in the train-pipe pressure.

In the controlling and arighting mechanism, both as herein shown and as described in the above identified applications, only gradual reductions of train-pipe pressure, below fifty pounds, are employed. Hence, the ordinary actions of the brake apparatus, are not in anywise interfered with. All the service applications of the brakes are effected by reductions of the train-pipe pressure, without necessarily going below fifty pounds. The emergency action is not interfered with, as the reduction necessary to cause said emergency action must be very quick, while the reductions to operate the controlling and arighting devices, may be made gradual. The emergency action will throw the controllers and arighters into action; but the reduction of train-pipe pressure, for operating the controllers and arighters will not cause the emergency action.

Having regard, now, to the pressure retaining mechanism proper, $f$ represents a pipe leading from the exhaust opening of the triple valve to a single passage exhaust way $f'$, formed in the casing casting $h$. A cam-wheel $f^2$ is located in an expanded portion of the said exhaust passage $f'$, and operates upon the downwardly extended stem $f^3$ of a retaining valve proper $f^4$, seated in the casing $h$. The said valve $f^4$ is provided with a cap $f^5$, with escape openings $f^6$ to the atmosphere, and is subject to the action of a weight $f^7$ suspended by the spring $f^8$ seated on the valve and encircling the valve-stem. This spring suspended weight tends to throw the valve $f^4$ into its lowermost or closed position; and when in that position, it will operate as a retaining valve, to permit only a limited escape or exhaust from the brake motor and will retain a pressure thereon, according to the weight $f^7$ and the area of the valve $f^4$. This, of course, would be arranged to retain any desired pressure, say, of fifteen pounds. The cam-wheel $f^2$ has four cam surfaces and four corresponding depressions, in alternate arrangement. Hence, on successive one-eighth turns, it will raise the valve $f^4$ into its open position, and on the next one-eighth turn, permit the valve to again be closed by its weight. When the valve $f^4$ is thrown into its open position, by one of the cam surfaces on the cam-wheel $f^2$, a free escape or exhaust will be afforded from the brake motor. This would be the normal position of the said cam-wheel $f^2$ and the valve $f^4$, when the train was running on level sections of the track; and in fact, at all times, except when it is desired to employ the "retainers." The said valve, is shown, however, in Fig. 2, in its closed position. It is obvious, that the cam-wheel $f^2$ might be arranged to be operated by hand; but instead of so doing, I operate the same by both the controller and the arighter, which will now be described. The said cam-wheel $f^2$ is carried on the back end of a shaft $k$, seated in the casing $h$, and in the removable caps $h'$ against spring-seated end bushings $h^2$. The shaft $k$ has rigidly secured thereto, a pair of ratchets $n$ and $p$, and a pair of loose crank-disks $n'$ and $p'$. The said crank-disks are provided with spring-held pawls $n^2$ and $p^2$ respectively, engaging the respective ratchet wheels $n$ and $p$. The said crank-disks are also provided with crank-pins $n^3$ and $p^3$, which are engaged by push-rods $n^4$ and $p^4$, respectively. The said push-rods are subject to the action of pistons $n^5$ and $p^5$, working in cylinders $n^6$ and $p^6$, on one side of the said shaft $k$, and to springs $n^7$ and $p^7$, in spring cases $n^8$, $p^8$, on the opposite side of said shaft $k$. In other words, the said push-rods $n^4$ $p^4$, are subject to the action of the pistons $n^5$ and $p^5$ at one end, and to the springs $n^7$ and $p^7$, at the other end. The spring-cases $n^8$ and $p^8$ are provided with passages $n^9$ $p^9$, opening to the atmosphere. The cylinders $n^6 p^6$ are provided with ducts $n^{10}$ $p^{10}$, respectively, through which the air from the train-pipe A, is supplied (indirectly) and exhausted.

The parts above enumerated, marked with corresponding powers of the letters $n$ and $p$, are in all respects duplicates with the single and important exception of the ratchet-wheels $n$ and $p$. These ratchet-wheels differ, in this important way, that the ratchet-wheel $p$, has only half the number of teeth contained on the ratchet-wheel $n$. Otherwise stated, the ratchet-wheel $n$ has teeth corresponding both to the opening and closing positions of the cam-wheel $f^2$, with respect to the valve $f^4$; while the ratchet-wheel $p$ has teeth corresponding to only one class of said positions, which, in the construction shown, is the opening position of said cam-wheel $f^2$.

The parts so far noted, which are marked with the letter $n$, and its powers, constitute the controller proper, and the parts marked with the letter $p$ and its powers, constitute the arighter proper; which in function correspond to the parts called by the same names, in the joint application hereinbefore referred to, and which in construction differ therefrom only in minor details.

Referring now to my important improvement, the ducts $n^{10}$ and $p^{10}$, each terminates in a double valve-seat $r$, which is fitted with a double-headed trip-valve $r'$, the connecting-stem of which is of angular form. This trip-valve $r'$ is connected to a diaphragm $r^2$, or other equivalent movable body, located in a fluid chest $r^3$, which is in communication by duct $r^4$ with the train-pipe A. The said diaphragm is therefore subject to train-pipe pressure on one side; and, on the other side, is subject to a predetermined yielding resistance, which as shown is afforded by a graduated spring $r^5$, seated in a spring-case $r^6$ and bearing against a head-piece $r^7$, on the end of the trip-valve stem. The tension of the spring $r^5$ is adjustable by nut $r^8$, which is provided with an opening $r^9$ to the atmosphere. The left member of the trip-valve $r'$ is covered by a cap $r^{10}$, provided with an exhaust opening $r^{11}$ to the atmosphere. The parts marked with corresponding powers of the letter $r$, are duplicates in all respects, one set co-operating with the controller proper, and the other with the arighter, above referred to, with the single exception, that the springs $r^5$ differ in tension, the spring which co-operates with the controller proper being of higher tension than the corresponding spring, which co-operates with the arighter.

The shaft $k$ carries at its front end, a graduated indicator dial $s$, marked to indicate the open and closed positions of the cam-wheel $f^2$, with respect to the valve $f^4$, which dial is visible through a glass peep-hole $s'$, in the front casing cap $h'$.

The passage in which the stem of the trip-valve $r'$ is located, is provided with an annular enlargement $r^{12}$, at the junction of the duct $n^{10}$ or $p^{10}$, for the purpose of affording a free passage for the air to all sides of the said valve-stem. The hole or passage in which the said valve-stem fits is round, while the stem is of angular form, as shown in Fig. 7. This construction affords, of course, a free passage for the air in one way or another, according to which member of the double valve seat $r$, is uncovered.

Operation: Having regard now to the action or operation of the mechanism, let it be assumed that the graduated springs $r^5$ have a resistance equal respectively to forty-five pounds and forty pounds, the particular spring co-operating with the controller proper having the higher resistance of forty-five pounds. Let it also be assumed that the springs $n^7$ and $p^7$ have a resistance of, say twenty pounds. This resistance of twenty pounds is abundantly sufficient, with a considerable margin of excess, for operating the pawl and ratchet mechanism on the shaft $k$ and the cam-wheel $f^2$ for controlling the retaining valve $f^4$; while at the same time there is a large difference between the resistance afforded by the said springs $n^7$ and $p^7$ and the said graduated springs $r^5$, the purpose of which is to give a quick action to the controllers and arighters, as will appear later. When the parts are in their normal position, as would be the case when running on level sections of track, the retaining valve $f^4$ will be in its raised or open position, held up by the cam-wheel $f^2$. This will be the position of the parts at all times when it is not desired to call the retaining mechanism into use. In this normal position of the parts, there will be, of course, seventy pounds pressure in the train-pipe; the diaphragms $r^2$ will be forced to the right against the springs $r^5$, holding the trip-valves $r'$ in position to render train-pipe pressure available behind the pistons $n^5$ and $p^5$, and forcing the same to the right against their respective springs $n^7$ and $p^7$, with their corresponding pawls $n^2$ and $p^2$ in position for engagement with their respective ratchets $n$ and $p$. In other words, these parts would be in the positions shown in Figs. 4, 5, 6, 9 and 10 of the drawings. Suppose now, that the train be at the top of a grade, and it is desired to set the retainers. The engineer, by manipulating his brake-valve, will reduce the train-pipe pressure slightly below forty-five pounds, taking care not to reduce the same to forty pounds. The effect of this will be to permit the particular spring $r^5$, which co-operates with the controller, to become active on its trip-valve $r'$ and throw the same into its closed position, thereby cutting off the train-pipe from the controller motor and opening the said motor to exhaust from the duct $n^{10}$. As quick as this occurs, all pressure behind the controller piston $n^5$ is reduced to that of the atmosphere, and the spring $n^7$ becomes active to throw the push-rod $n^4$ and the piston $n^5$ toward the left, thereby operating the pawl and ratchet mechanism $n n^2$ and turning the cam-wheel $f^2$ one-eighth turn, or into the position shown in Fig. 2 in full lines. This will permit the valve $f^4$ to be lowered into its closed position by the weight $f^7$. Hence a limited pressure, say fifteen pounds, will be held on the brake-motors. The brakes may then be set and released as often as desired, and the train-pipes and auxiliary reservoirs recharged while retaining this limited pressure on the brake-motors and a proportionate amount on the brakes, until it is desired to throw off the retainers. When an engineer reaches a point on a grade where he desires to throw off the retainers, he simply reduces the train-pipe pressure again, below forty-five pounds. The effect of this will be to again bring the controller into action, thereby turning the cam-wheel $f^2$ another eighth turn in the same direction; which will raise the valve $f^4$ into its open position, and afford a free passage for the exhaust from the brake-motor through the triple-valve.

The arighter enables the engineer to make sure that all the retaining valves $f^4$ on the train occupy common positions at any given time. For example, when the cars are uncoupled the train-pipe is of course empty; and, in this condition, the spring $p^7$ of the arighter will have acted last on the shaft $k$ and the cam-wheel $f^2$, and will have thrown the said cam-wheel into position for raising the retaining valve $f^4$ into its open position, if it was not already so left by the last action of the controller. If the cam-wheel $f^2$ had been left in position to open the valve $f^4$, on the last action of the controller, then, when the arighter push-rod $p^4$ was operated by its spring $p^7$, its pawl $p^2$ would have failed to catch the notch on its ratchet $p$. In other words, the pawl when moved would not be operative on the ratchet $p$ and the shaft $k$. This is due, as has already been explained, to the fact that the teeth on the ratchet $p$ are only half the number of those on the ratchet $n$, and correspond only to the opening positions of the cam-wheel $f^2$. The arighter is important for another purpose. With the engineer's brake-valves now in general use, the reductions in the train-pipe are determined by the engineer from the inspection of the gage. Naturally the reductions are more or less inexact, depending on the character of the engineer, or the direction of his attention at the time. For these reasons the train-pipe pressure is liable to be reduced, on service application, below forty-five pounds regardless of whether or not it is desired to set the retainers. If this should occur, the engineer noting the same on his gage, will simply reduce the pressure on down below forty pounds, thereby throwing the arighters into action, and insuring a return or positioning of all the retaining valves $f^4$ in their normal or open positions.

In order to preserve the use of the word "controller" in its broad sense, consistent with its usage in the other cases herein identified, I have used the word "controller-motor" to designate the cylinder and piston co-operating with the controller proper, and the words "arighter-motor" for the cylinder and piston co-operating with the arighter proper. By the usage of these terms the distinctions can be readily maintained without confusion.

It should be noted that every car of the train would, of course, be equipped with the mechanism herein described; and to enable the engineer to, at all times, see the positions occupied by the valve controlling cam-wheel $f^2$, a dummy would be carried in the engineer's cab as one of the series on the train. This dummy device would be exactly like all the others, with the exception that the valve, and the exhaust passage, &c., to the same, would be omitted.

The particular construction of the retaining valve $f^4$ in its relation to the spring $f^8$ and the weight $f^7$, considered broadly as an improvement in gravity seated valves is not claimed herein; but is claimed in a companion case filed by me of even date herewith, entitled "gravity seated valves." This construction is, however, of special value on retaining mechanism, as it prevents unseating of the valve by the vibration of the car, and avoids release by leakage.

What I claim, and desire to secure by Letters Patent of the United States, is as follows:

1. The combination with retaining valve mechanism for fluid pressure brake-motors, of the controller for the same, comprising a controller-motor, with connections to said valve mechanism, and the two-way trip-valve operative by a variation of fluid pressure, against a predetermined yielding resistance, to open said controller motor to supply and exhaust, substantially as described.

2. The combination with a train-pipe, brake motor and retaining valve mechanism, of a controller for said valve mechanism, comprising a controller-motor, with connection to said valve mechanism, and a two-way trip-valve operative by variation of train-pipe pressure, against a predetermined yielding resistance, to open said controller-motor to supply and exhaust, substantially as described.

3. The combination with the train pipe, brake-motor and retaining valve mechanism of the controller for said valve mechanism, comprising a controller-motor with connections operating, on successive actions, to throw said valve mechanism alternately into its closed and open positions, and an arighter motor, with connections, adapted, when operated, to insure the positioning of said valve mechanism in one class of said positions, and independent two-way trip valves operative by variations of train-pipe pressure, against different predetermined yielding resistances to open said controller and arighter motors to supply and exhaust, substantially as described.

4. The combination with a brake-motor, having a single exhaust passage external of the triple valve, of a self closing retaining valve in said passage, a cam operative on said valve to throw the same into its open position and to permit the same to assume its closed position, substantially as described.

5. The combination with a brake-motor having a single exhaust passage, external of the triple valve, of a self closing retaining valve in said passage, a cam operative on said valve to throw the same into its open position and to permit the same to assume its closed position, and a controller with connections to said cam operative by a variation of fluid pressure, substantially as described.

6. The combination with the pawl and ratchet devices, of the controller and arighter cylinders and pistons, on one side of said pawl and ratchet devices, the spring cases and springs on the other side of said pawl and ratchet devices, the push-rods coupled to the reciprocating members of said pawl and ratchet devices, and subject to the action of said pistons at one end and to said springs at the other, and retaining valve mechanism operated by said pawl and ratchet devices substantially as and for the purposes set forth.

7. The combination with the controller and arighter motors, each having a duct for supply and exhaust, of the double valve seat $r$ in each of said ducts, the double headed trip-valves $r'$ in said seats, the diaphragms $r^2$, the fluid chest $r^3$ in communication with the train-pipe $a$, and the graduated spring $r^5$ acting on said diaphragm in resistance to the train-pipe pressure, substantially as and for the purposes set forth.

In testimony whereof I affix my signature in presence of two witnesses.

JOHN K. LENCKE.

Witnesses:
S. S. SMALL,
JAS. F. WILLIAMSON.